United States Patent
Wiggins et al.

(10) Patent No.: US 10,780,528 B2
(45) Date of Patent: Sep. 22, 2020

(54) METHODS FOR RESIDUAL STRESS REDUCTION IN ADDITIVE MANUFACTURING PROCESSES

(71) Applicant: HONEYWELL INTERNATIONAL INC., Morris Plains, NJ (US)

(72) Inventors: Jimmy Wiggins, Chandler, AZ (US); Robbie Joseph Adams, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 811 days.

(21) Appl. No.: 15/363,133

(22) Filed: Nov. 29, 2016

(65) Prior Publication Data

US 2018/0147670 A1 May 31, 2018

(51) Int. Cl.
*B23K 26/342* (2014.01)
*B33Y 10/00* (2015.01)
(Continued)

(52) U.S. Cl.
CPC .......... *B23K 26/342* (2015.10); *B22F 3/1055* (2013.01); *B23K 15/0086* (2013.01); *B33Y 10/00* (2014.12); *B33Y 50/02* (2014.12); *B22F 5/04* (2013.01); *B23K 2101/001* (2018.08); *B23K 2101/006* (2018.08); *Y02P 10/295* (2015.11)

(58) Field of Classification Search
CPC .......... B33Y 10/00; B33Y 30/00; B33Y 40/00; B33Y 50/00; B33Y 50/02; B23K 26/342
USPC .............................. 219/76.1, 76.12
See application file for complete search history.

(56) References Cited

U.S. PATENT DOCUMENTS 7,286,893 B1 10/2007 Mazumder
7,301,120 B2 11/2007 Adams
(Continued)

FOREIGN PATENT DOCUMENTS

CN 101607311 B 9/2011

*Primary Examiner* — Tu B Hoang
*Assistant Examiner* — Alba T Rosario-Aponte
(74) *Attorney, Agent, or Firm* — Lorenz & Kopf, LLP

(57) ABSTRACT

A method for additively manufacturing an article includes providing or obtaining a build material, directing a first energy beam at the build material to raise the temperature of the build material above a melting point of the build material, and thereafter withdrawing the first energy beam to allow the build material to solidify into a first layer. The method further includes directing a second energy beam at the first layer, wherein the second energy beam differs from the first energy beam in that the second energy beam is of insufficient energy to cause melting of the first layer of build material and after directing the second energy beam at the first layer, providing additional build material over the first layer. The second energy beam will have an effect of reducing or eliminating residual stresses of each build layer. The energy of the second energy beam can be controlled using a thermal or optical feedback loop. Still further, the method includes directing a third energy beam at the additional build material to form a second layer that is metallurgically fused with the first layer. The process is repeated until an entire 3D shape of desired geometry is completed resulting in a part with reduced of free of residual stress or the potential of cracks within the 3D shape.

8 Claims, 6 Drawing Sheets

(51) Int. Cl.
*B23K 15/00* (2006.01)
*B33Y 50/02* (2015.01)
*B22F 3/105* (2006.01)
*B23K 101/00* (2006.01)
*B22F 5/04* (2006.01)

(56) References Cited

U.S. PATENT DOCUMENTS

| | | |
|---|---|---|
| 7,326,377 B2 | 2/2008 | Adams |
| 2013/0233846 A1* | 9/2013 | Jakimov ............... B22F 3/1055 219/601 |
| 2013/0264750 A1* | 10/2013 | Hofacker .............. B22F 3/1055 264/497 |
| 2014/0263209 A1* | 9/2014 | Burris .................. B23K 26/034 219/121.62 |
| 2015/0041025 A1 | 2/2015 | Wescott et al. |
| 2016/0185048 A1* | 6/2016 | Dave ...................... B33Y 50/02 700/119 |
| 2016/0250717 A1* | 9/2016 | Kruger ................. B22F 3/1055 219/76.1 |
| 2019/0270247 A1* | 9/2019 | Hyatt .................... B29C 64/273 |

* cited by examiner

METHODS FOR RESIDUAL STRESS REDUCTION IN ADDITIVE MANUFACTURING PROCESSES

TECHNICAL FIELD

The present disclosure generally relates to metal component manufacturing, and finds particular application in the aerospace industry, including the manufacturing of gas turbine engine and other aerospace vehicle components. More particularly, the present disclosure generally relates to additive manufacturing processes, including methods for residual stress reduction in additive manufacturing processes.

BACKGROUND

Metal components find broad application in a variety of industries. Using the aerospace industry as one example of such industries, metal components find application in the manufacture of gas turbine engines and other aerospace vehicle components. For example, gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary vanes. The combustion gas flow deflects off of the vanes and impinges upon turbine blades of a turbine rotor. A rotatable turbine disk or wheel, from which the turbine blades extend, spins at high speeds to produce power. Gas turbine engines used in aircraft use the power to draw more air into the engine and to pass high velocity combustion gas out of the gas turbine aft end to produce a forward thrust.

Additive manufacturing is a recently-developed technology that allows for the rapid production of metallic components that may be used in any industry that requires metallic components, for example, gas turbine engine and other aerospace applications. As such, additive manufacturing technology is becoming an efficient method widely used in industry to create parts from metal alloys. Additive manufacturing processes use an energy beam welding method, focused on the surface of a substrate, to melt a controlled layer of metal alloy to precision build a three dimensional (3D) shape as each layer is formed. Precision control of the deposition parameters is necessary to control the welded thickness of each layer allowing required part tolerances to be achieved. Melting of the substrate surface in conjunction with the precisely controlled parameters enables the process to build a 3D shape layer by layer and thereby creating a 3D metal part.

When these thin layers of metal are melted to the previous layer and consolidated with other portions of a shape being built and then solidified in place, there is a large thermal gradient, pronounced local distortion, and significant contraction locally as the heat from the energy beam passes to the next location. These physical effects result in localized stresses and are herein referred to as residual stresses. The residual stresses that are formed during additive manufacturing processes are sometimes large enough to cause cracking in the additively manufactured article. Because additive manufacturing builds layer upon layer by melting the surface of the previous layer, these residual stresses naturally form. The solidification of layer upon layer will exacerbate the buildup of residual stresses within the metal alloy matrix. The resultant residual stresses with the alloy matrix can cause stress cracks in the 3D part being formed in the process. These stress cracks may result in the entire part being scrapped.

Accordingly, it would be desirable to provide additive manufacturing processes that reduce the incidence of residual stresses or thermal cracking. In this regard, it would be desirable to provide additive manufacturing processes that reduce the incidence of local distortion of the in-process components as additional metal layers are built there-upon. Furthermore, other desirable features and characteristics of the hybrid bonded turbine rotor, as well as other components, and the method for manufacturing the same will become apparent from the subsequent detailed description and the appended claims, taken in conjunction with the accompanying drawings and the preceding background.

BRIEF SUMMARY

Improved additive manufacturing processes are disclosed herein for the purpose of reducing residual stresses or thermal cracking. In one exemplary embodiment, a method for additively manufacturing an article to reduce the incidence of thermally-induced residual stress includes the steps of providing or obtaining a build material, directing a first energy beam at the build material to raise the temperature of the build material above a melting point of the build material, and thereafter withdrawing the first energy beam to allow the build material to solidify into a first layer. The method further includes directing a second energy beam at the first layer, wherein the second energy beam differs from the first energy beam in that the second energy beam is of insufficient energy to cause melting of the first layer of build material, wherein the energy of the second energy beam is determined on the basis of a solution to a differential equation that describes temperature distribution around a heat source, and, after directing the second energy beam at the first layer, providing additional build material over the first layer. Still further, the method includes, after providing the additional build material over the first layer, directing a third energy beam at the additional build material to raise the temperature of the additional build material above the melting point of the build material and thereafter withdrawing the third energy beam to allow the additional build material to solidify into a second layer that is metallurgically fused with the first layer.

The energy can come from surface energy impingement or internal energy generation. The former could be form and limited to a laser, electron beam, infrared, arc, etc. The latter can be from energy such as but not limited to electromagnetic, microwave, or eddy currents, radio frequencies, etc.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The present disclosure provides methods for performing additive manufacturing processes in order to reduce the residual stresses in the metal alloy matrix of the in-process metal article. In this manner, the present disclosure provides methods to reduce or eliminate the incidence of cracking or fracturing that has heretofore been encountered in additive manufacturing processes. In particular, the residual stresses may be significantly reduced or eliminated below a critical level by heating the previously deposited layer to an annealed condition, prior to forming the overlying layer, as the metal article is built-up, layer-by-layer, during the additive manufacturing process. This heating may stress-relieve the material immediately below that top layer by raising the underlying layers to the annealing temperature. The heating level of the underlying layers may be provided to be well below the metallic material melting point. As such, by reducing the maximum temperature and eliminating melting, the distortion and contraction is reduced, and existing residual stresses are also reduced. The underlying layer heating may be performed between the deposition of one layer and the deposition of the next layer as the metal article is built-up, layer-by-layer, resulting in the decrease or removal of residual stresses in the metal matrix preventing stress cracks, and consequently preventing the part from being scraped. Less part scrap will mean higher yield in the process, thus reduced costs.

Figure 1:
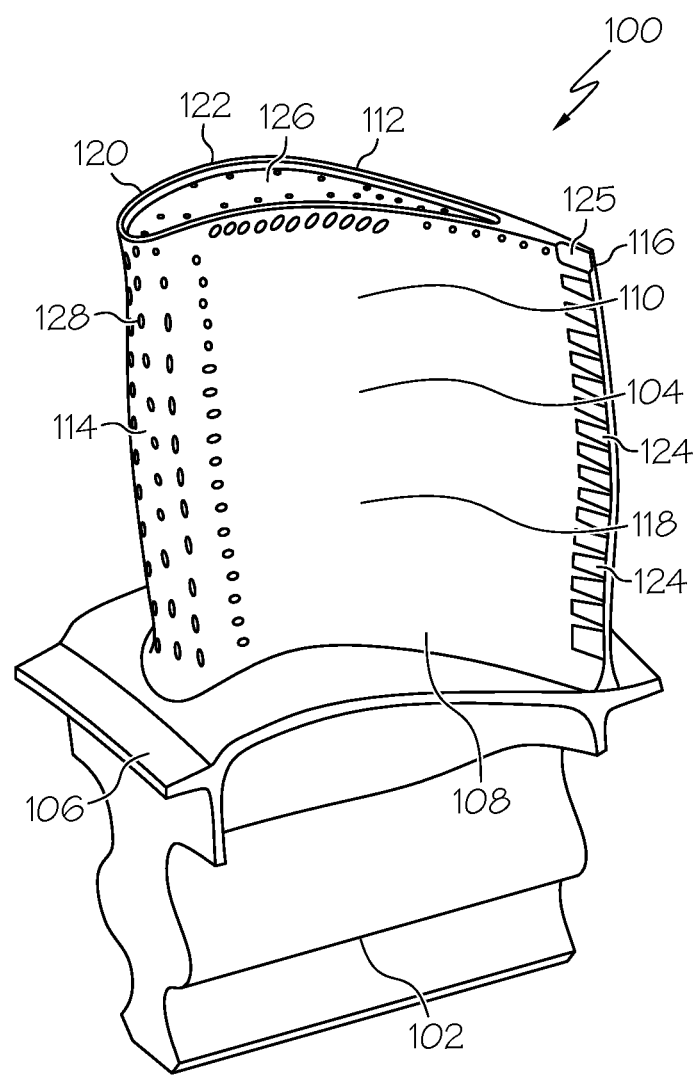
FIG. 1 is an exemplary gas turbine engine component, particularly a turbine blade, which may serve as the metallic article of the present disclosure, in some embodiments; note that a turbine rotor is a possible application but residual stress control in AM is applicable to any deposit/part.

As noted above, the methods of the present disclosure are suitable for use in producing metallic articles for any industry using additive manufacturing. As further noted above, one exemplary industry is the aerospace industry, and one exemplary metallic article is a component of a gas turbine engine. Thus, for purposes of illustrate and completeness of description, without any intent to be limiting as to the uses of applications of the presently-described methods, FIG. 1 illustrates an exemplary gas turbine engine blade configuration 100 that may be suitable for use in connection with the methods described herein, in one embodiment. The blade 100 includes a blade attachment section 102, an airfoil 104, and a platform 106. The blade attachment section 102 provides an area in which a shape is machined. In an embodiment, the shape corresponds with a shape formed in a respective blade attachment slot (not shown) of the turbine hub. For example, in some embodiments, the shape may be what is commonly referred to in the art as a "firtree" shape. In other embodiments, the shape may be a beveled shape. However, in other embodiments, any one of numerous other shapes suitable for attaching the blade 100 to the turbine may be alternatively machined therein.

The airfoil 104 has a root 108 and two outer walls 110, 112. The root 108 is attached to the platform 106 and each outer wall 110, 112 has outer surfaces that define an airfoil shape. The airfoil shape includes a leading edge 114, a trailing edge 116, a pressure side 118 along the first outer wall 110, a suction side 120 along the second outer wall 112, a tip outer wall 122, a plurality of pressure side discharge trailing edge slots 124 (the edge slot at the tip is the tip trailing edge slot 125), a tip plenum 126 recessed radially inward from the tip outer wall 122, and a series of holes 128 (commonly referred to in the art as "buick" holes). Holes 128 may be provided along the leading edge 114, along the first outer wall 110 near the tip outer wall 122, and/or along the tip plenum 126. Though not shown in FIG. 1, the blade 100 may have an internal cooling circuit formed therein, which may extend from an opening in the platform 106 through the blade 100 and may include various passages that eventually communicate with the plurality of trailing edge slots 124 and the tip trailing edge slot 125, or other openings (not shown) that may be formed in the blade 100. In particular, the convex suction side wall 112, the concave pressure side wall 110, and the tip 122 each include interior surfaces defining the internal cooling circuit.

Figure 2:
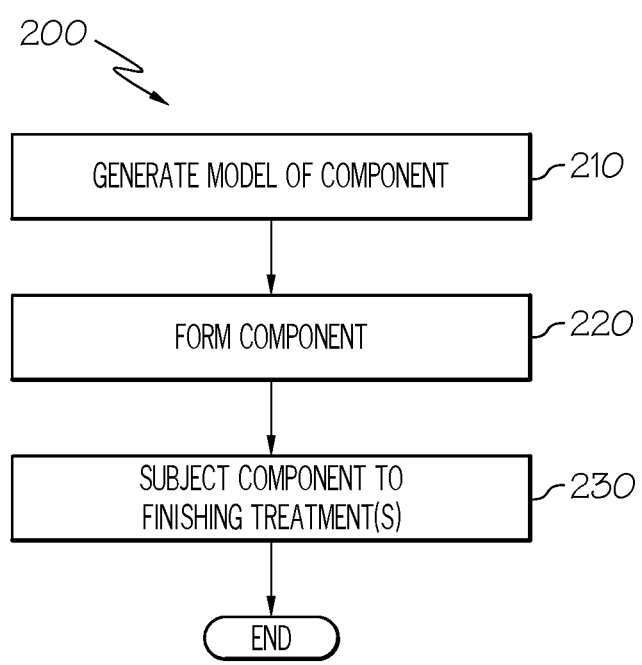
FIG. 2 is a flow diagram illustrating steps in a method of forming a metallic article using additive manufacturing techniques in accordance with some embodiments the present disclosure.

The gas turbine engine blade 100 of FIG. 1, or any other metallic article (for use in a gas turbine engine or otherwise), may be manufactured in accordance with the additive manufacturing techniques described in connection with FIGS. 2 and 3. FIG. 2 is a flowchart illustrating a method 200 for manufacturing an article/component, for example the gas turbine engine blade 100, using additive manufacturing techniques based on low energy density energy beams. In a first step 210, a model, such as a design model, of the component may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component. Of course, it is not necessary that a "near-net" component be formed using this process. Rather, it may simply be desired to produce a "block" of the oxide dispersion-strengthened alloy using additive manufacturing. Accordingly, the present disclosure should not be considered as limited by any particular article/component design.

In step 220 of the method 200, the component is formed according to the model of step 210. In one exemplary embodiment, a portion of the component is formed using a rapid prototyping or additive layer manufacturing process. In other embodiments, the entire component is formed using a rapid prototyping or additive layer manufacturing process. Although additive layer manufacturing processes are described in greater detail below, in still other alternative embodiments, portions of the component may be forged or cast in step 220.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In other embodiments, electromagnetic beams or sounds waves may be employed to supply the energy. In one particular exemplary embodiment, direct metal laser fusion (DMLF) is used to produce the article/component in step 220, such as blade 100. DMLF is a commercially available laser-based rapid prototyping and tooling process by which complex parts may be directly produced by precision melting and solidification of metal powder into successive layers of larger structures, each layer corresponding to a cross-sectional layer of the 3D component. In some embodiments, in place of a metal powder, the build material may be provided in the form of granules, a wire, or a continuous rod or filament.

As such, in one exemplary embodiment, step 220 is performed with DMLF techniques to form the component. However, prior to a discussion of the subsequent method steps, reference is made to FIG. 3, which is a schematic view of a DMLF system 300 for manufacturing the component, for example but not limited to one or more aerospace components, in accordance with an exemplary embodiment.

Figure 3:
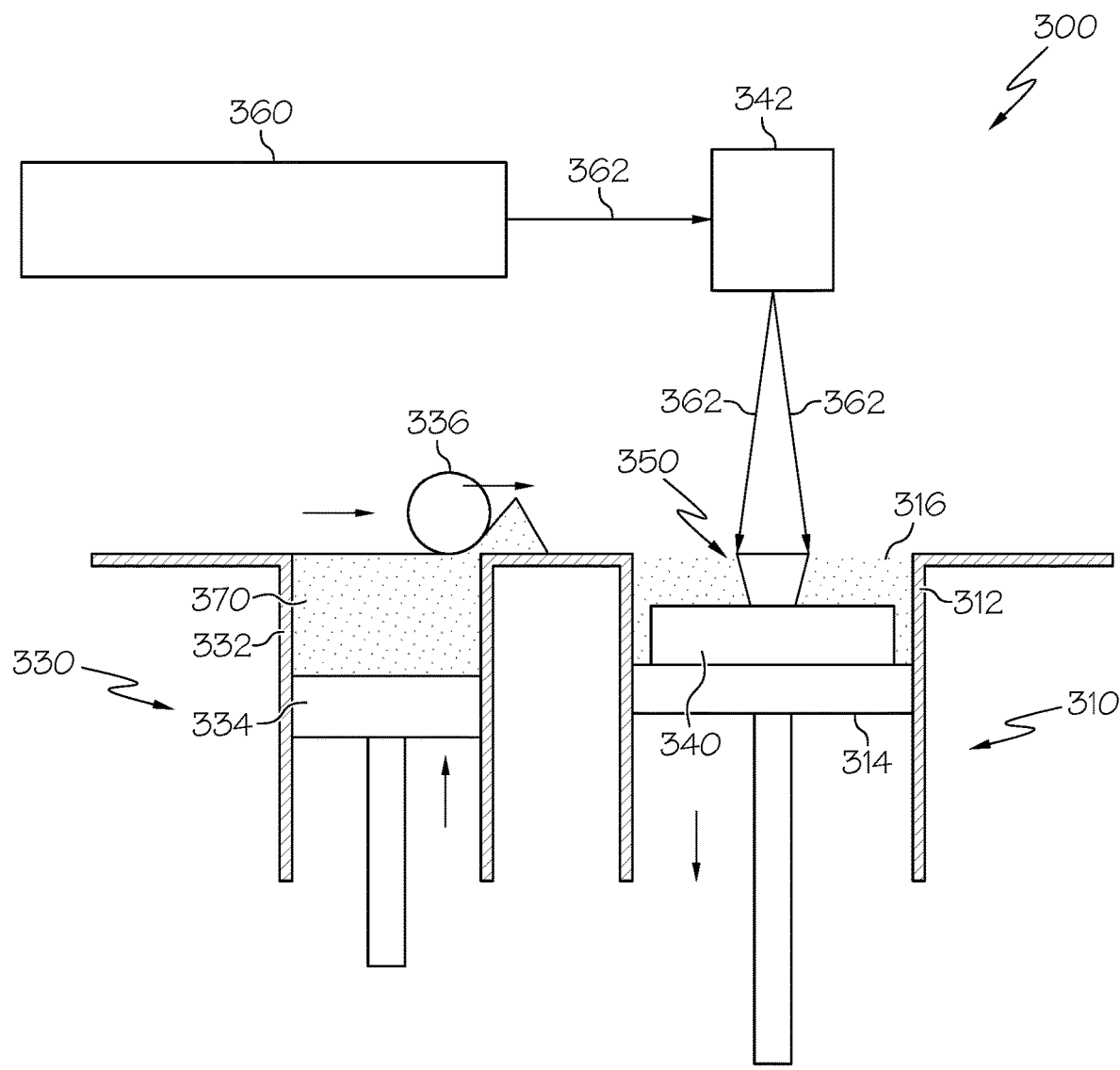
FIG. 3 is an exemplary additive manufacturing system suitable for use in forming a metallic article in accordance with some embodiments of the present disclosure.

Referring to FIG. 3, the system 300 includes a fabrication device 310, a powder delivery device 330, a scanner 342, and a low energy density energy beam generator, such as a laser 360 (or an electron beam generator) that function to manufacture the article 350 (e.g., the component) with build material 370. The fabrication device 310 includes a build container 312 with a fabrication support (i.e., build plate) 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310. Generally speaking, the build material may be any metal or metal alloy that has been or may possibly be used in additive manufacturing processes. In the example of gas turbine engine components, nickel-based super alloys are common materials. In other embodiments, the build material is a plastic material, such as a thermoplastic material.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 342 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

As initially noted above, during the currently-described additive manufacturing process, as the metallic article is built-up, layer-by-layer, the residual stresses may be eliminated or reduced by applying an energy beam, such as laser beam 362, to the layer just-deposited prior to depositing the next layer. One method for doing so is to use the energy beam 362 that melts the deposit but modifying it to prevent melting by controlling the intensity or heat input. The beam 362 may be passed over the previously-deposited layer prior to depositing the next layer. The heat intensity (energy density) of the beam energy or the sweep rate density or both may be reduced to below that needed to melt the material and provide the proper heat to reduce or eliminate residual stresses. This "reduced" level for purposes of pre-heating (as opposed to the level required for forming the subsequent layer) may be set at a constant, or alternatively, algorithms may be included in the power control to adjust for feature geometry. For example, in many cases due to the layered construction method, the metallic article in-process may feature an approximate thin column construction, which is modeled based on one-dimensional heat flow. In other cases, the metallic article in-process may feature an approximate thin plate construction, which is modeled based on two-dimensional heat flow. Still further, in other cases, the metallic article in-process may feature an approximate thick plate construction, which is modeled based on three-dimensional heat flow. The model-based algorithms may be used to adjust the pre-heating of each preceding layer for the subsequent deposition of each succeeding layer.

Figure 4A:
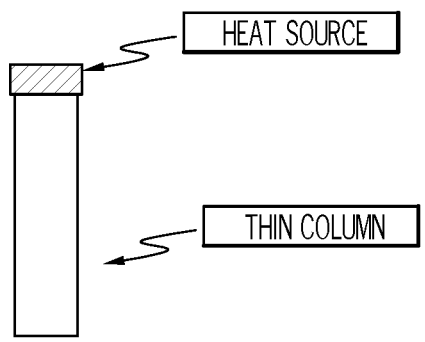
FIGS. 4A-4C illustrate various idealized shapes of metallic components that may be produced using additive manufacturing in accordance with some embodiments of the present disclosure.
Figure 4B:
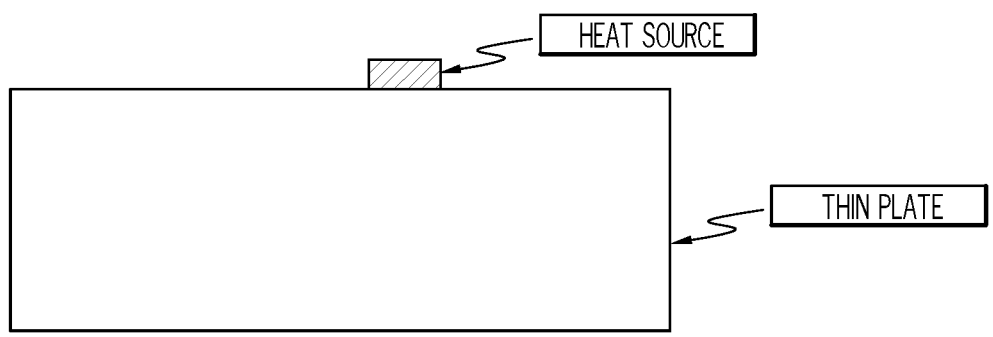
Figure 4C:
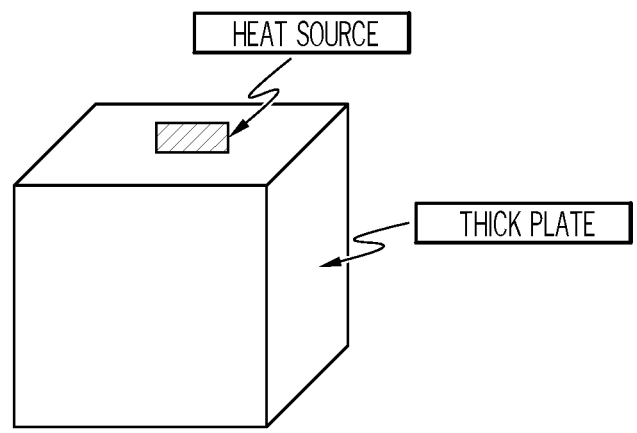
Figure 5:
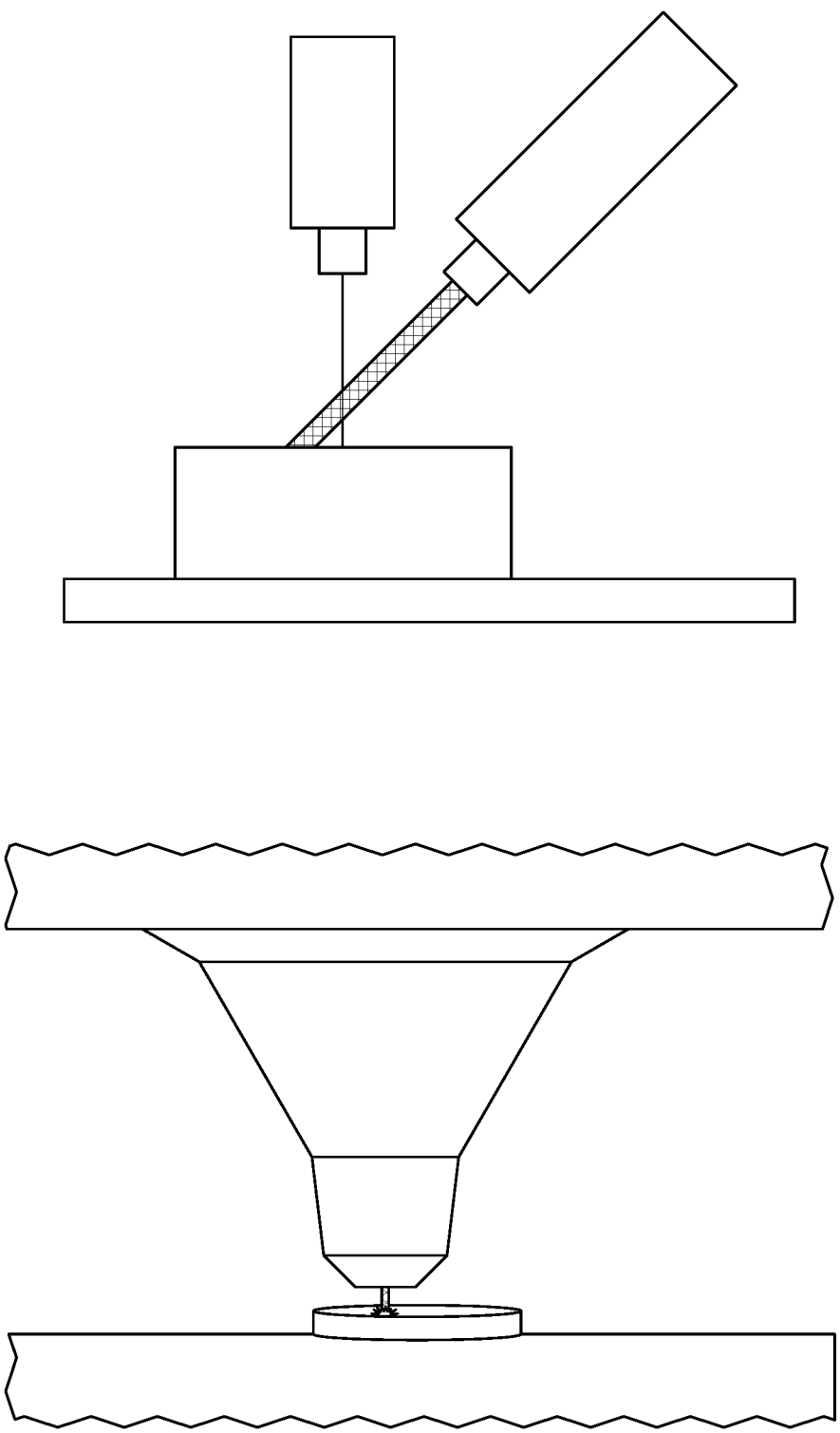
FIG. 5 illustrates directed energy deposition technologies in accordance with some embodiments.

Greater detail regarding the above-noted algorithms for pre-heating energy beam (laser beam 362) control is provided in connection with FIGS. 4A-4C, wherein FIG. 4A models the one-dimensional flow case, FIG. 4B models the two-dimensional flow case, and FIG. 4C models the three-dimensional flow case. First, with attention to FIG. 4A, one-dimensional flow is modeled using a thin column, as illustrated. Using differential equation solutions, the characteristic equation of one-dimensional heat transfer for this model is as follows:

$$l = l_0 + (t_f - t_0) \cdot e^{-nt}$$

where $$n = \lambda v + \sqrt{\lambda v^2 + m}$$

and $$m = \frac{4}{d} \cdot \frac{k_1}{k}$$

Second, with attention to FIG. 4B, two-dimensional flow is modeled using a thin plate, as illustrated. The characteristic equation of two-dimensional heat transfer for this model is as follows:

$$t - t_0 = \frac{Q_v}{2\pi k} e^{-\lambda v \xi} \frac{K_0(\lambda vr)}{g}$$

Third, with attention to FIG. 4C, three-dimensional flow is modeled using a thick plate, as illustrated. The characteristic equation of three-dimensional heat transfer for this model is as follows:

$$t - t_0 = \frac{Q_v}{2\pi k} e^{-\lambda v \xi} \frac{e^{-\lambda vR}}{R}$$

For the three characteristic equations of heat transfer provided above, the following parameters are defined:

t is the temperature at point of interest, which may be measured at or near the thin layer, $t_0$ is the temperature at or near a far point away from the heat source such as an interface between the article and a support plate that supports the article, $t_f$ is the fusion temperature of the material being fused, v is the velocity of the heat source, where in the uniaxial condition=f (a constant)*1(the current impinging on the feature), d is the diameter of the column, $k_1$ is the thermal surface transmission, $Q_v$ is the heat input as applied by the pre-heating energy beam, k is the thermal conductivity of the build material, λ is the thermal diffusivity of the build material, ξ is defined as a distance from the aforesaid point of interest to a point wherein the second energy beam is applied at the thin layer as the heat source moves along the x axis and ξ=x(of point of interest)−v*s(time from start), v is the scan speed of the second energy beam, $K_0$ is a Bessel function of the $2^{nd}$ kind, order 0, r is the radial distance from the second energy beam to the aforesaid point of interest, and R is the radius of the sphere of heat produced by the heat source.

As alluded to above, the algorithm should be solved, regardless of the particular model used, such that (t) is sufficient for pre-heating purposes, but remains well-below the melting point of the metal material. For example, temperatures such as 50, 100, 200, or 300 degrees below the melting point may be selected for (t). $Q_v$, the heat input as applied by the pre-heating energy beam (e.g., laser beam 362), is controlled using the controllable parameters of the particular additive-manufacturing apparatus employed. For example, $Q_v$ can be reduced (as compared to the usual power for fabricating a new layer) by reducing the power input, by increasing the speed of or defocusing the laser beam 362, or some combination thereof. Defocusing the energy beam reduces the energy density. At a properly selected lower heat input and/or power density, the top material (most recently formed layer) will be heated but not melted. This pre-heating step will thus reduce the residual stresses but not melt the material nor affect phase formation. Furthermore, the pre-heating step should be performed shortly before the next layer is ready to be formed, that is, shortly before additional build material is dispersed over the underlying, pre-heated layer, and the laser beam is re-directed at the additional built material to melt the additional built material in to the overlying layer. Preferably, the time between pre-heating the underlying layer and forming the subsequent layer is as short as possible, such as 10 seconds or less, 5 second or less, or 1 second or less.

The selection of which model to employ for the algorithm used to control the pre-heating functionality of laser beam 362 depends largely on the geometry of the particular metallic article in-process. Moreover, some articles may benefit from the use of multiple models, in various sequences, as the article is built-up. For example, with reference back to the exemplary gas turbine engine blade shown in FIG. 1, the three-dimensional, thick plate model may be employed as the attachment section 102 is built-up (section 102 being a thick, solid block of metal), and the two-dimensional, thin plate model may be employed as the tip outer wall 122 is built-up. It is believed that it is well-within the skill of the ordinary artisan to determine whether a particular layer of an in-process metallic article is best approximated using the one-, two-, or three-dimensional models noted above.

Returning now to FIGS. 2 and 3, upon completion of a respective layer, including the preheating and subsequent layer addition steps as described above, the fabrication support 314 is lowered and the delivery support 334 is raised. Typically, the fabrication support 314, and thus the article 350, does not move in a horizontal plane during this step. Then, the most recently formed layer is preheated as described above, and the roller or wiper 336 again pushes a portion of the build material 370 from the delivery device 330 to form an additional layer of build material 370 on the working plane 316 of the fabrication device 310. This process repeats itself as the metallic article is built-up, layer-by-layer. That is, the laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

In one embodiment, optionally, the additive manufacturing apparatus of FIG. 3 may be outfitted with a sensor that provides the temperature near the melt pool (t) and/or positioned distantly ($t_0$) from the melt pool. This method could be applied to a closed loop control system to precision control pre-heating temperatures. In addition, this approach with the temperature feedback loop could be applied to newly-deposited layers to optimize the deposition heat input.

Returning to FIG. 2, at the completion of step 220, the article/component may be given a stress relief treatment and then is removed from the additive manufacturing system (e.g., from the DMLF system 300). In optional step 230, the component formed in step 220 may undergo finishing treatments. Finishing treatments may include, for example, polishing and/or the application of coatings. If necessary, the component may be machined to final specifications Accordingly, the present disclosure has provided methods for performing additive manufacturing processes in order to reduce the residual stresses in the metal alloy matrix of the in-process metal article, and, in order to reduce or eliminate the incidence of cracking or fracturing that has heretofore been encountered in additive manufacturing processes. In particular, the residual stresses may be significantly reduced or eliminated below a critical level by heating the previously deposited layer to an annealed condition, prior to forming the overlying layer, as the metal article is built-up, layer-by-layer, during the additive manufacturing process. This heating may stress-relieve the material immediately below that top layer by raising the underlying layers to the annealing temperature. As such, by reducing the maximum temperature and eliminating melting, the distortion and contraction is reduced, and existing residual stresses are also reduced, resulting in the decrease or removal of residual stresses in the metal matrix preventing stress cracks, and consequently preventing the part from being scraped. Less part scrap will mean higher yield in the process, thus reduced costs.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for additively manufacturing an article to reduce the incidence of thermally-induced residual stress comprising the steps of:
providing or obtaining a build material;
directing a first energy beam at the build material to raise the temperature of the build material above a melting point of the build material, and thereafter withdrawing the first energy beam to allow the build material to solidify into a first layer;
directing a second energy beam at the first layer, wherein the second energy beam differs from the first energy beam in that the second energy beam is of insufficient energy to cause melting of the first layer of build material, wherein the energy of the second energy beam is determined on the basis of a solution to a differential equation that describes temperature distribution around a heat source, wherein the solution to the differential equation that determines the energy of the second energy beam is modeled on the basis of a one-, two-, or three dimensional heat transfer model;
after directing the second energy beam at the first layer, providing additional build material over the first layer;
after providing the additional build material over the first layer, directing a third energy beam at the additional build material to raise the temperature of the additional build material above the melting point of the build material, and thereafter withdrawing the third energy beam to allow the additional build material to solidify into a second layer that is metallurgically fused with the first layer, wherein the one-dimensional heat transfer model is defined according to the following equations:

$$l = l_0 + (t_f - t_0) \cdot e^{-nt}$$

where $$n = \lambda v + \sqrt{\lambda v^2 + m}$$

and $$m = \frac{4}{d} \cdot \frac{k_1}{k}$$

wherein the two-dimensional heat transfer model is defined according to the following equation:

$$t - t_0 = \frac{Q_v}{2\pi k} e^{-\lambda v \xi} \frac{K_0(\lambda v r)}{g}$$

wherein the three-dimensional heat transfer model is defined according to the following equation:

$$t - t_0 = \frac{Q_v}{2\pi k} e^{-\lambda v \xi} \frac{e^{-\lambda v R}}{R}$$

and,
wherein parameters for the foregoing three heat transfer models are provided as follows:
t is a temperature at a point of interest on the first layer,
$t_0$ is a temperature at a second point away from the point of interest,
$t_f$ is a fusion temperature of the build material being fused,
v is a velocity of the second energy beam,
d is a diameter,
$k_1$ is a thermal surface transmission,
$Q_v$ is a heat input as applied by the second energy beam,
k is a thermal conductivity of the build material,
λ is a thermal diffusivity of the build material,
ξ is a distance from the point of interest to a point wherein the second energy beam is applied to the first layer,
v is a scan speed of the second energy beam, $K_0$ is a Bessel function of the $2^{nd}$ kind, order 0, r is a radial distance from the second energy beam to the point of interest, and R is a radius of a sphere of heat produced by the second energy beam.

2. The method of claim 1, wherein the build material comprises a metal material or a plastic material.

3. The method of claim 1, wherein the build material is provided in the form of a powder, granules, a wire, or a continuous rod or filament.

4. The method of claim 1, wherein the first, second, and third energy beams are each independently one of a laser beam, an electron beam, or an electromagnetic beam.

5. The method of claim 1, wherein (t) is a temperature that is below the melting temperature of the build material, and the one-, two-, or three-dimensional model is solved for $Q_v$, and wherein $Q_v$ is used to adjust parameters of the second energy beam as compared to the first energy beam.

6. The method of claim 5, wherein the parameters comprise one or more of a scan speed, an input energy, energy pulse, pulse shape, pulse segment fraction time and an energy beam focus.

7. The method of claim 1, further comprising measuring (t) and ($t_0$) to generate a feedback control loop (consisting of: infrared sensing, optical sensing, puddle shape sensing, etc.).

8. The method of claim 1, wherein an amount of time between directing the second energy beam and directing the third energy beam is 10 seconds or less.

* * * * *